United States Patent [19]

Sumino

[11] Patent Number: 4,724,696
[45] Date of Patent: Feb. 16, 1988

[54] SYSTEM FOR CONTROLLING BAR CUTTER IN STEEL BAR LINE

[75] Inventor: Tomoko Sumino, Kobo, Japan

[73] Assignee: Mitsubishi Denki Kabushiki Kaisha, Japan

[21] Appl. No.: 868,557

[22] Filed: May 30, 1986

[30] Foreign Application Priority Data

Jun. 4, 1985 [JP] Japan .......................... 60-122924
Jun. 4, 1985 [JP] Japan .......................... 60-122925

[51] Int. Cl.$^4$ ............................................. B21B 1/00
[52] U.S. Cl. ............................................. 72/203; 72/15; 83/370
[58] Field of Search .................. 83/369, 370; 72/14, 72/15, 17, 10, 12, 203

[56] References Cited

FOREIGN PATENT DOCUMENTS

| 0173672 | 8/1985 | European Pat. Off. |
| 1463718 | 12/1969 | Fed. Rep. of Germany. |
| 2112158 | 10/1971 | Fed. Rep. of Germany. |
| 2351525 | 4/1975 | Fed. Rep. of Germany .......... 72/17 |
| 2626784 | 12/1976 | Fed. Rep. of Germany. |
| 2332378 | 3/1978 | Fed. Rep. of Germany. |
| 2458763 | 3/1982 | Fed. Rep. of Germany. |
| 3333001 | 3/1985 | Fed. Rep. of Germany. |
| 2939955 | 7/1985 | Fed. Rep. of Germany. |
| 14026 | 2/1981 | Japan .......................... 72/15 |
| 968418 | 9/1964 | United Kingdom. |
| 1391475 | 4/1975 | United Kingdom. |

OTHER PUBLICATIONS

"Improvement in Cold Shear Yield of Bar Mill by Computer System", Inazaki et al., *Tsetsu-to-Hagane, Journal of the Iron and Steel Institute of Japan*, Special Issue on Improvements of Yield in Rolling Processes and Developments of Rolling Theory", No. 15, vol. 67, Nov. 1981.
"Crop Shear Optimization and Control", Loose, *Iron and Steer Engineer*, Jul. 1984, pp. 41-48.
"Optimale Steuerung Rotierender Walzwerksscheren Mit Nikrorechner", Neue Hutte, 29, jg., H.9, Sep. 1984.

*Primary Examiner*—W. D. Bray
*Attorney, Agent, or Firm*—Leydig, Voit & Mayer

[57] ABSTRACT

A system for controlling a bar cutter in a steel bar line comprising a rolling length predicting circuit for calculating, on the basis of a scale loss coefficient, a predicted rolling length of a rolling bar material conveyed to the steel bar line, a flying shear cut instructing circuit responsive to the predicted length for determining a cutting length and for operating a flying shear to cut the rolling bar material in accordance therewith, a rolling length measuring circuit for determining an actual rolling length from the cut bar material, and a scale loss coefficient determining circuit for determining the scale loss coefficient based on the actual rolling length so as to correct the predicted rolling length and thereby reduce a cutting error.

2 Claims, 3 Drawing Figures

SYSTEM FOR CONTROLLING BAR CUTTER IN STEEL BAR LINE

BACKGROUND OF THE INVENTION

A steel bar is generally cut from a bar material in accordance with a consumer's purchase order (hereinafter referred to as "a material adoption"). Thus, a loss of material is produced in the cutting step. A further material loss occurs when material adoption is conducted by dividing a bar material into a plurality of bars, aligning the several divided bar materials in parallel and then cutting them into the necessary length.

Heretofore, an optimum cutting control of a steel bar has been proposed and disclosed, for example, in a thesis by K. Inasaki et al entitled "Improvements in Cold Shear Yield of Bar Mill by Computer" Control System, pages 207 to 213 of "Tetsu-to-Hagane" Vol. 67, No. 15, in 1981. According to this proposal, a rolled material is divided into a plurality of bar materials, and the number of times to repeatedly cut the divided bar materials into desirable lengths is determined so as to minimize material loss and, hence, optimize the overall operation.

In general, this cutting control relies on the principle of optimization which can be described by the equation:

$$f_k(x) = \underset{0 < x < M_k}{MiN} (g_k(x) + f_{k-1}(X - x)) \quad (1')$$

where $g_k(x)$: the loss when the k-th divided bar material is cut x times for the material adoption $f_k(x)$: the minimum loss expected when k pieces of divided bar materials are cut for the material adoption $f_1(x) = g_1(x)$ k = 2 to N N: The number of divided bar materials X: Total number of bars to be cut in parallel $M_k$: The maximum number of cuts possible from the divided bar material In other words, since the $f_{k-1}(X-x)$ is the minimum loss when (k−1) pieces of the divided bar materials are cut for (X−x) times of material adoptions, when the x is determined so that the total sum of the $f_{k-1}(X-x)$ and the loss $g_k(x)$ when the k-th divided material is cut x times may become minimum, it coincides with $f_k(x)$. If the maximum possible number of cutting the k-th divided material is represented by $M_k$, the value of x can take an integer numbers from 0 to $M_k$.

Though the conventional cutting control system is executed as described above, the prediction of the length of the rolled bar material causes an error in the actual rolling length due to a cutting operation based the prediction of the length according to the weight of the material. Further, since cutting errors also take place at the respective cutting position of a flying shear, a considerable difference in length occurs and material loss drastically increases. Thus, it is difficult to minimize the loss of the bar materials.

SUMMARY OF THE INVENTION

This invention has been made in order to eliminate such disadvantages of the prior-art system, and has for its object to provide a system for controlling a bar cutter in a steel bar line which can eliminate errors in the prediction of rolling a bar material and the cutting thereof.

A system for controlling a bar cutter in a steel bar line according to this invention measures the entire rolling length from the cut bar material to obtain the actual scale loss coefficient, and determines, based on the scale loss coefficient, a correction value for correcting a predicted rolling length so as to minimize the material loss.

Further, this invention obtains a correction amount of a cutting timing in the flying shear on the basis of an error between the actual measured value of the cut bar material and the corrected rolling length determined above so as to accurately control the cutting operation.

BRIEF DESCRIPTION OF THE DRAWINGS

In the drawings, the same symbols indicate the same or corresponding parts.

DESCRIPTION OF THE PREFERRED EMBODIMENTS

Figure 1:
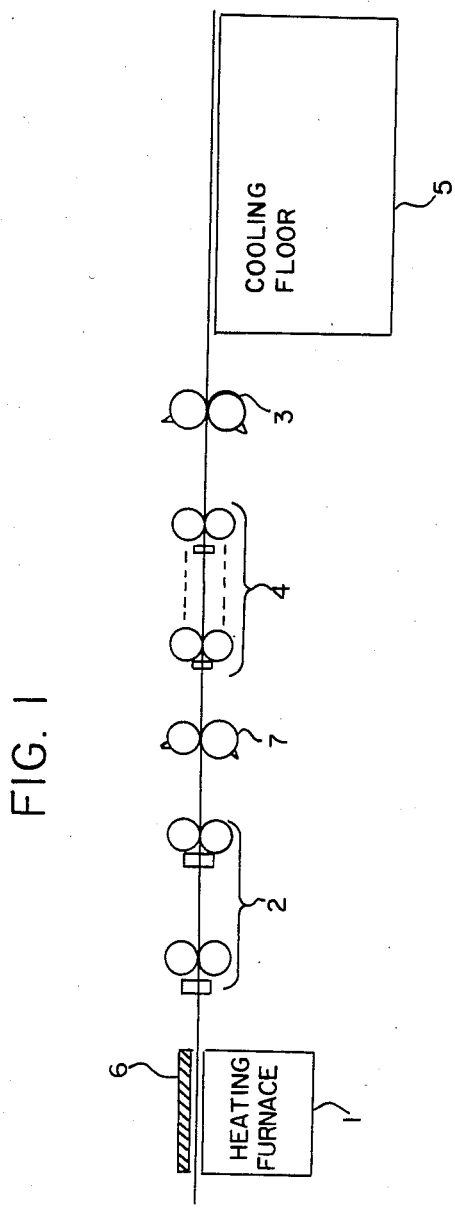
FIG. 1 is a schematic view of a steel bar rolling line.

FIG. 1 is a schematic view of the entire steel bar rolling line. In FIG. 1, numeral 1 designates a heating furnace for heating a bar material 6. After the heated bar material 6 is rolled by a rough rolling mill 2 into an adequate thickness and width, it is fed to a crop shear 7. The crop shear 7 cuts the abnormal shaped portions of the front and tail ends of the material 6. The material 6 thus cut (i.e. at the abnormal shaped portions) is rolled by a rolling mill 4 into the size of a final product, is subjected to a material adoption having a suitable length by a flying shear 3, and then fed to a cooling floor 5.

In order to determine the dividing length and number of the material 6 to be cut by the flying shear 3 in this rolling line, the entire rolling length of the material 6 is predicted as below.

The bar material 6 is extracted from the heating furnace 2, then rolled through the rough rolling mill 2 and the finishing rolling mill 4, and cut by the flying shear 3. At this time, the following relation equation is used to predict the entire rolling length.

$$L_0 = f(W_0, W_c, kg/m, S_{LOSS}) \quad (1)$$

where $L_0$: Predicted entire rolling length $W_0$: Weight of material $W_c$: weight of crop (i.e. weight of cut off and pieces)

kg/m: Unit weight $S_{LOSS}$: Scale loss coefficient

The dividing length and number of the material to be cut are determined with respect to the entire predicted rolling length value represented by the equation (1), and the material is accordingly cut by the flying shear 3 as a first stage.

Therefore, when the entire predicted rolling length value and the cutting timing by the shear coincide with desired values, the optimum cutting control is conducted.

It is first necessary to accurately know the scale loss coefficient so as to bring the entire predicted rolling length value into coincidence with the measured value. After the material is treated in the line, the length of the divided materials cut at the cooling floor inlet side are measured, the total length of the divided materials is obtained as the measured rolled value so as to obtain the actual measured value corresponding to one entire rolling length, and the measured value is substituted for the above-mentioned prediction equation to determine the scale loss coefficient.

Then, in order to eliminate the cutting error by the flying shear, the length of the divided materials cut at the cooling floor inlet side are measured, the rate of the displacement with respect to the length of the material adoption is examined, and the correction amount is added to the cutting timing to regulate it, whereby the cutting error can be compensated. However, the finally divided materials are out of proportion since they are also affected by the influence of the error of the measured rolling length value.

Figure 2:
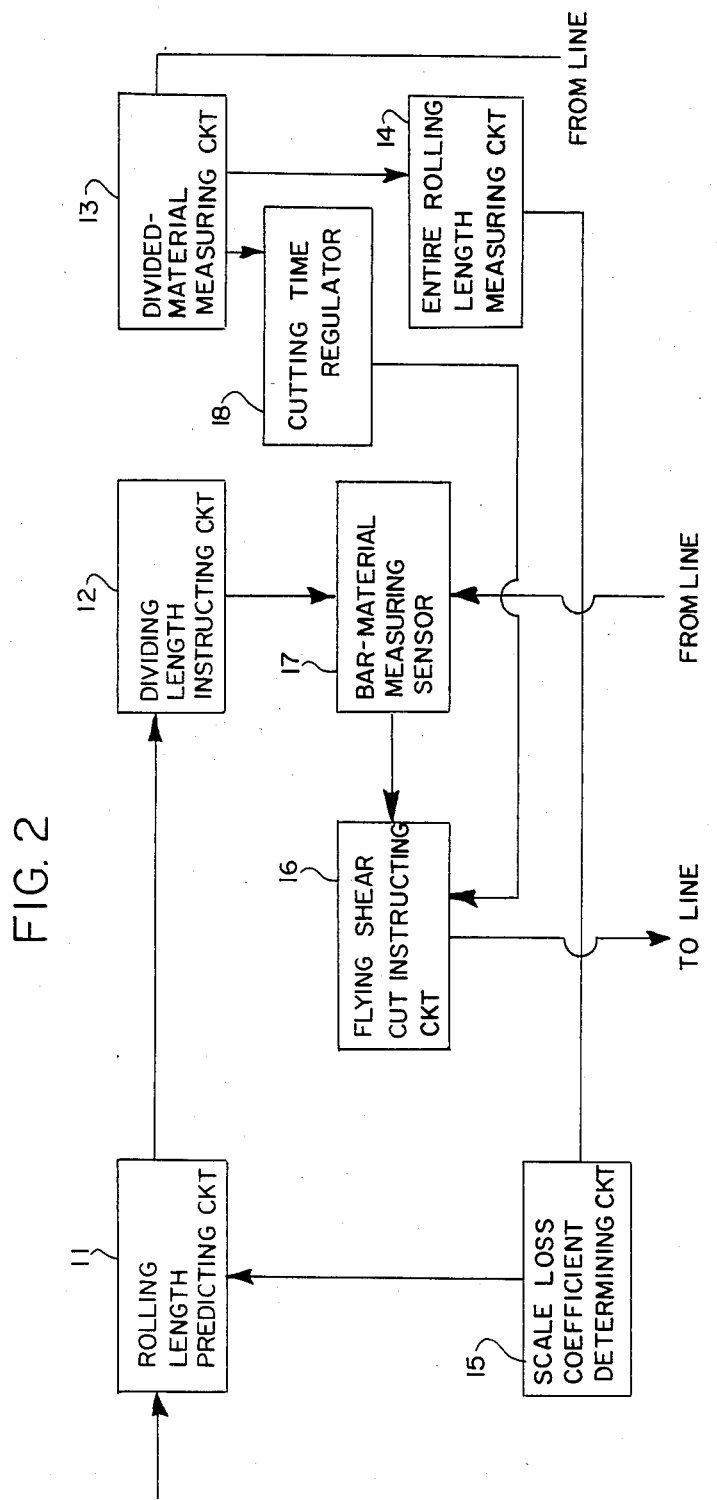
FIG. 2 is a view showing the construction of an embodiment of a system for controlling a bar cutter in a steel bar line according to this invention.

An embodiment based on the above-mentioned principle is shown in FIG. 2.

In FIG. 2, numeral 11 designates an entire rolling length predicting circuit, numeral 12 designates a dividing length instructing circuit, numeral 13 designates a divided material length measuring circuit, numeral 14 designates an entire rolling length measuring circuit, numeral 15 designates a scale loss coefficient determining circuit, numeral 16 designates a flying shear cut instructing circuit, numeral 17 designates a bar material measuring sensor, and numeral 18 designates a cutting timing regulator.

The scale loss coefficient deciding circuit 15 calculates $S_{LOSS}$ from the equation (1) on the basis of the actual measured data of the measuring circuit 14.

The crop weight $W_c$ of the equation (1) is the weight of the portion cut off at the front and tail ends of the material by the shear immediately before the bar material 6 reaches the finishing rolling mill. The flying shear cut instructing circuit 16 counts the timing that the cutting position arrives at the shear by the detection signal of the sensor 17 and outputs a command. The timing is corrected by an error signal from the regulator 18.

In FIG. 2, the rolling length predicted by the above-mentioned equation is first determined by the entire rolling length predicting circuit 11, and a command signal corresponding to the rolling length is fed to the dividing length instructing circuit 12. Then, the bar material measuring sensor 17 detects the end of the bar material, and according to the instructed length from the dividing length instructing circuit 12, instructs the flying shear cut instructing circuit 16, when the detected value arrives at the cutting length, to cut the bar material. When the cut bar material is disposed at the cooling floor inlet side, the actual length of the cut bar materials are obtained by the divided material measuring circuit 13, the actual measured value of the entire rolling length is obtained by the entire rolling length measuring circuit 14 to instruct the scale loss coefficient deciding circuit 15 accordingly, so that the correction coefficient may be determined, which is then associated with the next material to be cut. Then, the cutting timing regulator 18 calculates the correcting amount of the cutting timing on the basis of the error between the actually measured value and the instructed length to instruct the flying shear cut instructing circuit 16 accordingly, thereby sequentially correcting the timing and cutting of the material.

The above-mentioned operation is repeated to eliminate the difference between the predicted value and the actual measured value, whereby the cutting error approaches zero, thereby performing the optimum cutting control.

Figure 3:
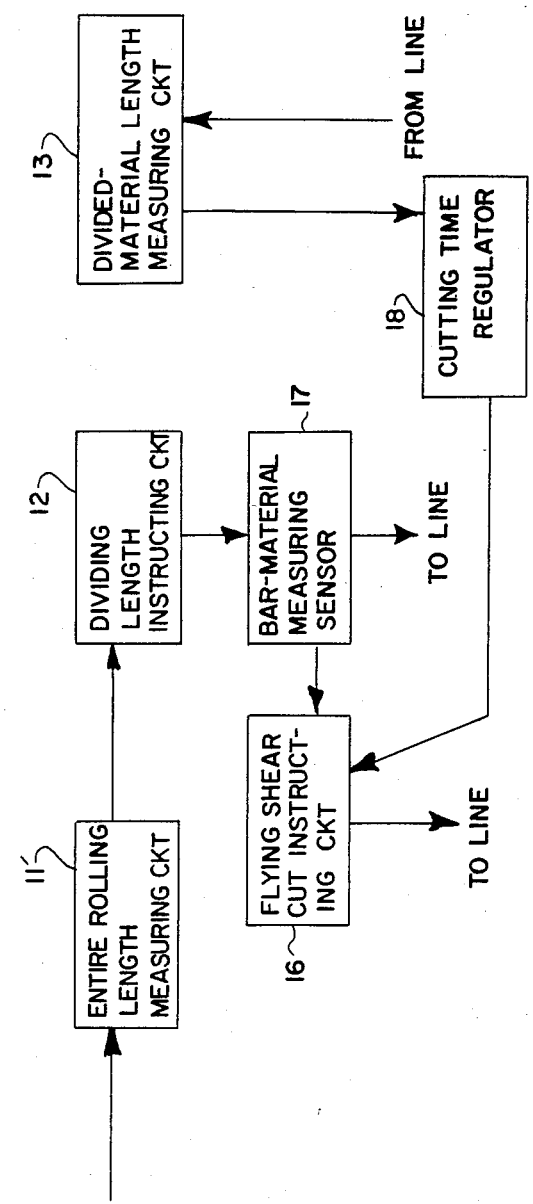
FIG. 3 is a view showing the construction of another embodiment of the invention.

FIG. 3 shows another embodiment of correcting the cutting timing on the basis of an error between the actual measured value of the already cut portions of divided materials and the dividing instruction length when the bar material is cut by the flying shear. In FIG. 3, the same symbols as those in FIG. 2 designate the same or equivalent parts. In FIG. 3, numeral 11' designates an entire rolling length measuring circuit, numeral 12 designates a dividing length instructing circuit, numeral 13 designates a divided material length measuring circuit, numeral 16 designates a flying shear cut instructing circuit, numeral 17 designates a bar material measuring sensor, and numeral 18 designates a cutting timing regulator.

According to this construction, the cutting length is decided on the basis of a more significant command by the rolling length measured by the entire rolling length measuring circuit 11', and fed to the dividing length instructing circuit 12. Then, the bar material measuring sensor 17 detects the front end of the bar material, and according to the instructed length from the dividing length instructing circuit 12, instructs the flying shear cut instructing circuit 16, when the detected value arrives at the cutting length to cut the bar material. Further, after this cutting operation is executed, the actual length of the cut material is measured by the divided material measuring circuit 13, the correcting amount of the cutting timing based on the error between the actual measured value and the instructed length is calculated by the cutting timing regulator 18 to instruct the flying shear cut instructing circuit 16 to correct the timing accordingly, thereby sequentially controlling the cutting of the next material.

Accordingly, when this operation is repeated, the cutting length error is eliminated to perform the optimum cutting control.

In the embodiments shown in FIGS. 2 and 3, the on-line function used for the present line information has been described. However, the invention is not limited to the particular embodiments. For example, the same advantages can be also expected even if off-line function for calculating in advance is employed.

What is claimed is:

1. A system for controlling a bar cutter in a steel bar line comprising a rolling length predicting circuit for calculating, on the basis of a scale loss coefficient, a predicted rolling length of a rolling bar material conveyed to the steel bar line, a flying shear cut instructing circuit responsive to the predicted length for determining a cutting length and for operating a flying shear to cut the rolling bar material in accordance therewith, a rolling length measuring circuit for determining an actual rolling length from the cut bar material, and a scale loss coefficient determining circuit for determining the scale loss coefficient based on the actual rolling length so as to correct the predicted rolling length and thereby reduce a cutting error.

2. A system for controlling a bar cutter in a steel bar line comprising a rolling length predicting circuit for calculating, on the basis of a scale loss coefficient, a predicted rolling length of a rolling bar material conveyed to the steel bar line, a flying shear cut instructing circuit responsive to the predicted length for determining a cutting length and for operating a flying shear on the basis of a cutting timing to cut the rolling bar material in accordance with the predicted rolling length, a rolling length measuring circuit for determining an actual rolling length from the cut bar material, a scale loss coefficient determining circuit for determining the scale loss coefficient based on the actual rolling length so as to correct the predicted rolling length, a cutting timing regulator for calculating a correcting amount of the cutting timing so as to correct a cutting error resulting from the difference between the actual and predicted rolling lengths.

* * * * *